S. NEEDLES.
COMBINED SPIRIT LAMPS AND BLOW PIPES.
No. 190,241. Patented May 1, 1877.
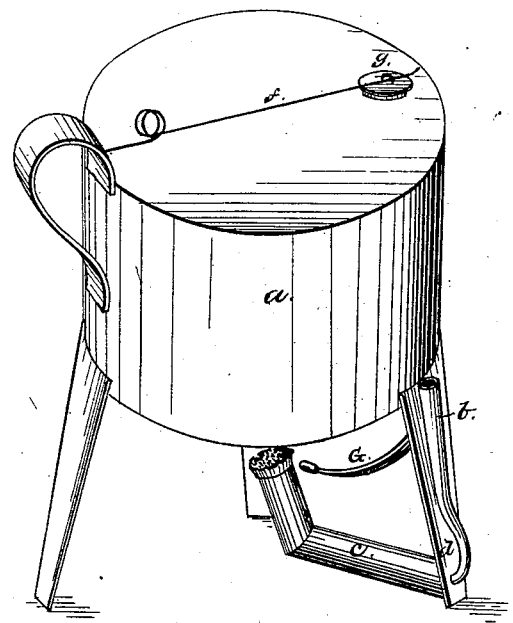
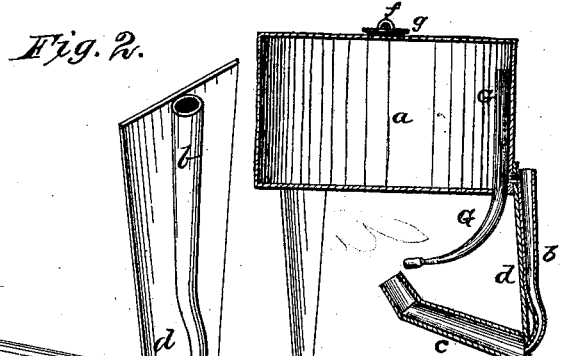
Witnesses:
John F. Smith
Horten S. Coolridge
Inventor:
Simgesmer Needles

UNITED STATES PATENT OFFICE.

SIMGESMER NEEDLES, OF HOLDEN, MISSOURI, ASSIGNOR TO I. NICHOLS AND B. F. METZLER, OF SAME PLACE.

IMPROVEMENT IN COMBINED SPIRIT-LAMP AND BLOW-PIPE.

Specification forming part of Letters Patent No. 190,241, dated May 1, 1877; application filed January 8, 1877.

*To all whom it may concern:*

Be it known that I, SIMGESMER NEEDLES, of Holden, in the county of Johnston and State of Missouri, have invented a new and useful Improvement in Combined Spirit-Lamp and Blow-Pipe, which improvement is fully set forth in the following specification, reference being had to the accompanying drawings, in which—

Figure 1 is a perspective, Fig. 2 a detail, and Fig. 3 a central vertical section.

The object of my invention is to simplify, and render more convenient, the spirit-lamp and blow-pipe now in use, which I do by means of supplying the wick, contained in the elbow $c$, with alcohol from the main cup $a$, through the supply-tube $b$.

To prevent explosion, I use the spring-valve $f\ g$, as shown in Fig. 1 of the accompanying drawing.

I claim as my invention—

The combination of the elbow $c$ with the supply-tube $b$ and the leg $d$, all connected with the main cup $a$.

SIMGESMER NEEDLES.

Witnesses:
 JOHN T. SMITH,
 H. S. COOLIDGE.